United States Patent
Hammer (10) Patent No.: US 9,842,236 B2
(45) Date of Patent: Dec. 12, 2017

(54) SCANNER INCLUDING A SWITCHABLE MIRROR AND METHOD FOR USING SAME

(71) Applicant: NCR Corporation, Duluth, GA (US)

(72) Inventor: Steven Joel Hammer, Lilburn, GA (US)

(73) Assignee: NCR Corporation, Duluth, GA (US)

( * ) Notice: Subject to any disclaimer, the term of this patent is extended or adjusted under 35 U.S.C. 154(b) by 82 days.

(21) Appl. No.: 14/795,193

(22) Filed: Jul. 9, 2015

(65) Prior Publication Data

US 2017/0011243 A1 Jan. 12, 2017

(51) Int. Cl.
*G06K 7/10* (2006.01)
*G02F 1/31* (2006.01)

(52) U.S. Cl.
CPC ......... *G06K 7/10683* (2013.01); *G02F 1/31* (2013.01); *G06K 7/1096* (2013.01); *G06K 7/10722* (2013.01); *G06K 7/10831* (2013.01)

(58) Field of Classification Search
CPC ... G06K 7/10683; G06K 7/10702; G02F 1/31
USPC .......................................... 235/462.32, 470
See application file for complete search history.

(56) References Cited

U.S. PATENT DOCUMENTS

| 9,010,638 B2 | 4/2015 | Moran et al. | |
| 2012/0018519 A1* | 1/2012 | McGarry | G06K 7/10722 235/462.11 |
| 2012/0118963 A1* | 5/2012 | Drzymala | G06K 7/10722 235/454 |

OTHER PUBLICATIONS

European Search Report dated Dec. 12, 2016 issued in copending European Patent Application No. 16170606.4.

* cited by examiner

*Primary Examiner* — Toan Ly
(74) *Attorney, Agent, or Firm* — Schwegman, Lundberg & Woessner (57) ABSTRACT

A scanner for scanning an item positioned in a scan volume can include: an electronically switchable mirror configured to switch between a reflective state and a transmissive state, a plurality of mirrors, and a camera having a sensor. In a method for scanning the item, the scanner can repeatedly: switch the switchable mirror from the reflective state to the transmissive state, image a first field of view of the item onto the sensor with light that reflects from at least one mirror and transmits through the switchable mirror, switch the switchable mirror from the transmissive state to the reflective state, and image a second field of view of the item onto the sensor with light that reflects from at least one mirror and reflects from the switchable mirror. In some examples, the scanner can synchronize the switching of the switchable mirror to a frame rate of the sensor.

11 Claims, 6 Drawing Sheets

SCANNER INCLUDING A SWITCHABLE MIRROR AND METHOD FOR USING SAME

BACKGROUND

A scanner can read optical codes, such as bar codes printed on or attached to a product. For example, an optical code scanner can be integrated with a point of sale terminal to read optical codes on items which are presented to the point of sale terminal for purchase as part of a purchase transaction.

SUMMARY

A scanner for scanning an item positioned in a scan volume can include: an electronically switchable mirror configured to switch between a reflective state and a transmissive state, a plurality of mirrors, and a camera having a sensor. In a method for scanning the item, the scanner can repeatedly: switch the switchable mirror from the reflective state to the transmissive state, image a first field of view of the item onto the sensor with light that reflects from at least one mirror and transmits through the switchable mirror, switch the switchable mirror from the transmissive state to the reflective state, and image a second field of view of the item onto the sensor with light that reflects from at least one mirror and reflects from the switchable mirror. In some examples, the scanner can synchronize the switching of the switchable mirror to a frame rate of the sensor. In some examples, a plurality of white light emitting diodes can illuminate the scan volume. In some examples, a processor in the scanner can additionally receive image data from the sensor of the camera, determine that an optical code is present in the image data, and identify an entity represented by the optical code.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various examples discussed in the present document.

DETAILED DESCRIPTION

As used herein, the term reflective is intended to signify that a relatively high fraction of incident light striking an optical element will be reflected from the optical element. For instance, a common bathroom mirror can be referred to as being reflective. As used herein, the term transmissive is intended to signify that a relatively high fraction of incident light striking an optical element will be transmitted through the optical element. For instance, a common household window can be referred to as being transmissive.

A scanner for scanning an item positioned in a scan volume can include: an electronically switchable mirror configured to switch between a reflective state and a transmissive state, a plurality of mirrors, and a camera having a sensor.

In a method for scanning the item, the scanner can repeatedly: switch the switchable mirror from the reflective state to the transmissive state, image a first field of view of the item onto the sensor with light that reflects from at least one mirror and transmits through the switchable mirror, switch the switchable mirror from the transmissive state to the reflective state, and image a second field of view of the item onto the sensor with light that reflects from at least one mirror and reflects from the switchable mirror. In some examples, the scanner can synchronize the switching of the switchable mirror to a frame rate of the sensor. In some examples, a plurality of white light emitting diodes can illuminate the scan volume. In some examples, a processor in the scanner can additionally receive image data from the sensor of the camera, determine that an optical code is present in the image data, and identify an entity represented by the optical code. In this manner, the processor can process the image data to simultaneously extract information from multiple fields of view, which are interleaved in alternating frames of the image data.

There can be advantages to using a scanner having such an electronically switchable mirror. For instance, where earlier laser-based scanners relied on differences in reflectivity at a single wavelength (such as 633 nm, which is the red wavelength used in He—Ne laser-based scanners), the present scanner can capture images of a scanned item using white-light illumination, which can provide more robust identification of product color schemes. As another example, where earlier laser-based scanners used one or more moving parts to scan a laser beam across the item, the present scanner can capture multiple fields of view of a scanned item without using any moving parts. These are but two examples; there can be other advantages as well.

Figure 1:
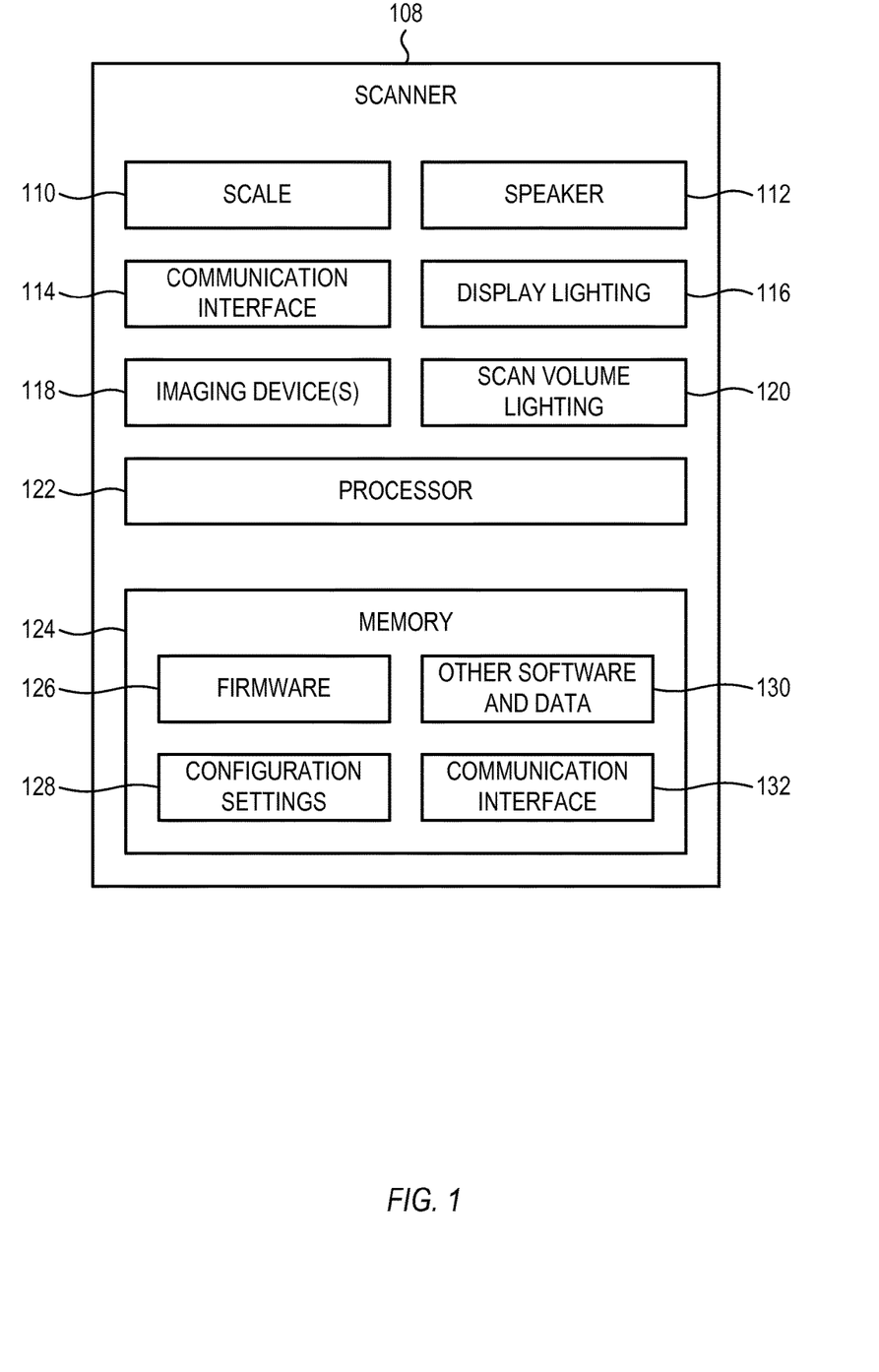
FIG. 1 is a block diagram illustrating the components of a scanner, according to an example embodiment.

FIG. 1 shows components of a scanner 108 that can be deployed at a checkout station such as a point of sale (POS) terminal, self-service terminal (SST), or other kiosk system including a scanner 108, according to an example embodiment. Note that the scanner 108 is shown schematically in greatly simplified form, with example components relevant to understanding various embodiments herein. Note that the scanner 108 can include more or fewer components in some embodiments.

Furthermore, the various components included in FIG. 1 as illustrated and arranged are provided for illustration purposes only. Note that other arrangements with more or fewer components are possible without departing from the contributions herein, in particular with regard to image processing.

Moreover, the methods and scanner 108 presented herein and below can include all or some combination of the components described and shown in the various contexts herein. Further, although the scanner 108 can be paired with a POS terminal, the scanner 108 can be a standalone element or an element of other systems, devices, and terminals in other embodiments. Examples of other terminal-types that can include a scanner 108 are SSTs, clerk operated and self-service library checkout stations, time-keeping terminals, and the like. Additionally, although a scanner is illustrated in FIG. 1 according to some embodiments, the image processing described herein can also be implemented with regard to images and video streams generated by other devices, such as stand-alone cameras.

The methods of some embodiments are programmed as executable instructions in memory and/or non-transitory computer-readable storage media and executed on one or more processors associated with the components and devices herein. For example, some embodiments can be deployed as firmware present within the scanner 108, such as firmware 126, or within another device such as a camera or other imaging device. In other embodiments, the image processing can be deployed as software on the scanner, a computer of a POS terminal or other terminal, with a network service that receives video from the scanner 108 or other imaging device, in a device driver, and the like.

The scanner 108 can be referred to as a product scanner or barcode scanner as that is the task most commonly associated with such devices. During operation, items are placed within a scan volume of the scanner 108. One or more imaging devices 118 of the scanner 108, such as one or more cameras, then scan a barcode and information read therefrom is communicated to a POS system. The POS system then uses that data to identify the item placed within the scan volume of the scanner 108 and performs an additional function. The additional function can include a price lookup and addition of the item to a list of items to be purchased, which can be presented on the one or more POS displays.

The scanner 108 can include one or more fields of view that encompass the scan volume, such as two fields of view of bi-optic scanners that are commonly seen in grocery and discount retail outlets. In addition to the imaging devices 118, the scanner 108 can include various other components. The various other components can include an integrated scale 110 such as can be used in a grocery outlet to weigh produce and one or both of a speaker 112 and display lighting 116 to output audio a visual signals such as signals of (un)successful scans. The scanner 108 can also include scan volume lighting 120 that can be turned on and off and adjusted based on a detected presence of an item to be scanned. In some examples, the scan volume lighting 120 can include one or more light emitting diodes, such as white light emitting diodes.

During typical operation, the scanner 108 is operated according to instructions executed on a processor 122. The processor 122 can be an application integrated circuit (ASIC), digital signal processor, microprocessor, or other type of processor. The instructions can be firmware 126 or software 130 stored in one or more memories 124. The one or more memories 124 can be or include volatile and non-volatile memories, write-protected memories, write-once memories, random access memory (RAM), read only memories (ROM), secure memory, and other memory and data storage types and devices.

The instructions as can be stored in firmware 126 or as software 130 in memory 124 are executed according configuration settings stored in the memory 124. The configuration settings 128 configure operation of the scanner 108 and the various components therein. For example, the configuration settings 108 can configure speaker 112 volume, display lighting 116 outputs, scan volume lighting 120 brightness, decoding algorithm of the imaging device(s) 118, such as camera(s), and the instructions, one or more communication protocols used to communicate data from the scanner 108 to a POS system or other system via wired or wireless connections, scale 110 operating parameters (e.g., unit of measure as pounds or kilograms), among other configuration settings the particular scanner 108 of an embodiment can include. In some embodiments, the configuration settings 128 can include a firmware version, a software version, and the like. Thus, when a configuration is set or updated, the setting or updating of the configuration settings 128 can include population and updates of any of the configuration settings 128 of a particular embodiment, including an update to firmware and software present on the scanner.

The scanner 108 can include one or more communication interfaces 114, 132 that enable the scanner 108 to communicate via one or both of wired and wireless connections over a network and with other computing devices. In some embodiments, the communication interface 132 can provide a virtualized communication connection on the scanner 108 that enables the scanner to communicate over a network leveraging network connectivity of a terminal or other computing device with which the scanner is paired, such as a POS terminal.

Figure 2:
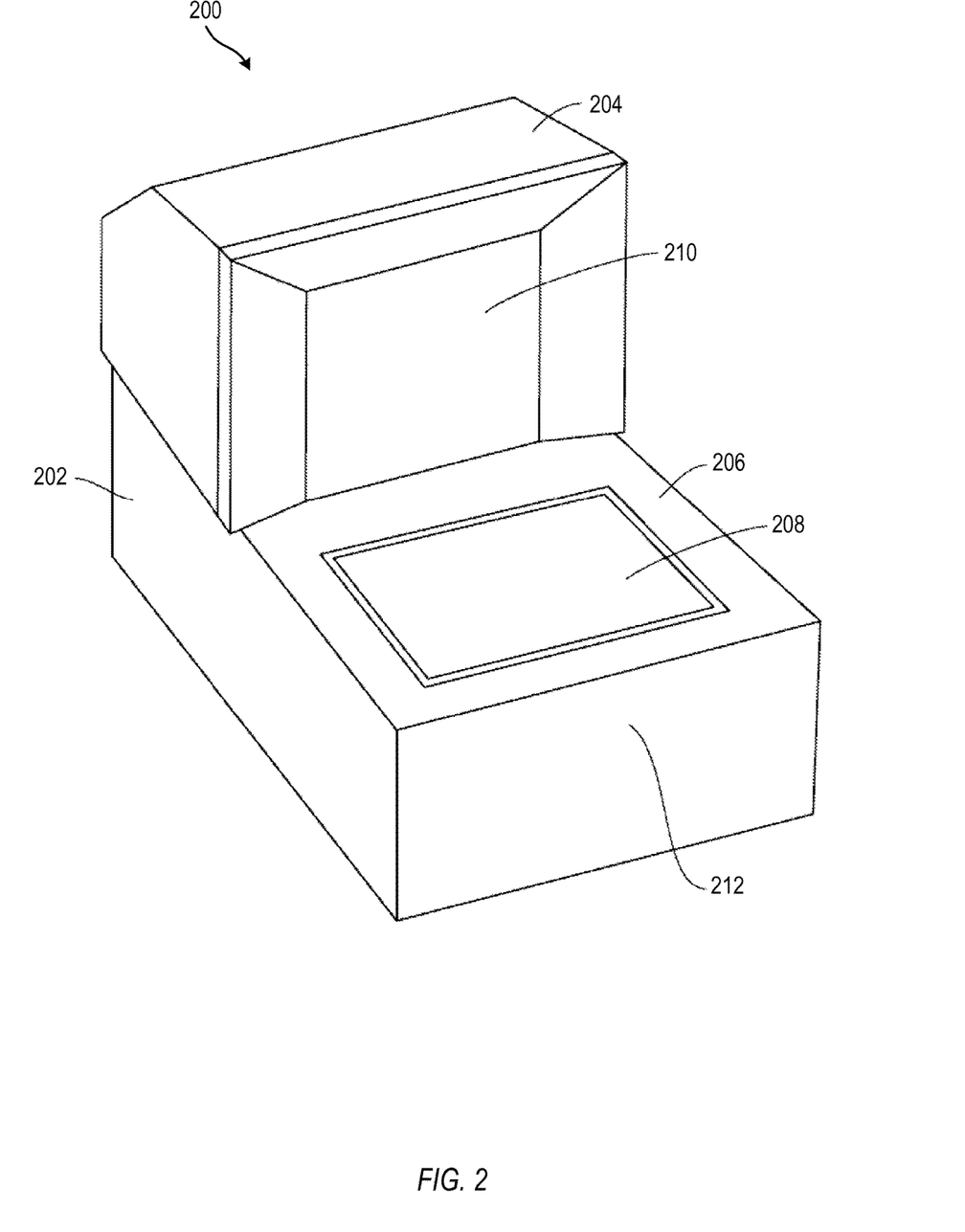
FIG. 2 shows an example of a scanner for scanning an item positioned in a scan volume, in accordance with some embodiments.

FIG. 2 shows an example of a scanner 200, in accordance with some embodiments. The scanner 200 can read optical codes presented to the scanner 200. An optical code is a computer readable representation of information. In some examples, an optical code can be attached to or printed on an item or object or displayed on an electronic display, such as the display screen of a cell phone or tablet computer. In some examples, the optical code can suitably include one dimensional or two dimensional bar codes. In some examples, the scanner 200 can read optical codes based on symbologies that include, but are not limited to: UPC, EAN, Code 128, GS1 DataBar™, Datamatrix, Aztec, QR and MaxiCode.

The scanner 200 can be located within a housing 202. The housing 202 can include a vertical housing component 204 and a horizontal housing component 206. In some examples, such as the example of FIG. 2, the scanner 200 can includes two scanning windows 208, 210; in other configurations, the scanner 200 can include a single scanning window, or three or more scanning windows. In the example of FIG. 2, the scanner 200 includes a horizontal scanning window 208 housed in the horizontal housing component 206, and a vertical scanning window 210 housed in the vertical housing component 204. The vertical scanner window 210 can face an operator side 212 of the scanner 200. The side of the vertical housing component 204 that houses the vertical scanning window 210 is the front of the scanner 200 and can face the operator of the scanner 200. The two scanning windows 208, 210 can be formed from an optically transparent material such as hurricane glass, sapphire coated glass or the like.

During use of the scanner 200, an operator can scan an item by orienting an optical code on an item or device so that the code faces either the vertical scanning window 210 or the horizontal scanning window 208, then moving the item past the scanning windows 208, 210. The scanner 200 can produce one or more indications to the operator, such as an audio sound, a light or both, once the optical code has been identified and read. The scanner 200 can use imaging technology to capture images of the optical code. The scanner 200 can process the captured images to decode the information stored in the optical code.

In some examples, the scanner 200 can fixed to a location when in operation. In other examples, the scanner 200 can be configured as a mobile or hand held scanner. In some examples, the scanner 200 can be part of a self-service checkout terminal, where the operator can be a customer that scans items for purchase. In other examples, the scanner 200 can be part of an assisted checkout terminal, where the operator can be an employee that is trained to operate the terminal and conduct a purchase transaction for a customer. In some examples, the scanner 200 can be part of a terminal that can be configured to function as a self-service checkout terminal at some times and an assisted checkout terminal at other times. In still other examples, the scanner 200 can be part of a system where the scanner 200 is used to identify items that pass by the scanner 200. In some examples, an operator can manually move items past the scanner 200; in other examples, a conveyor belt or the like can automatically move items past the scanner 200. Examples of these types of systems include, but are not limited to: inventory management systems, item routing systems, item sorting systems, mail or package sorting systems and the like.

In some examples, the scanner 200 can illuminate a scan volume, can capture images of an item as the operator or a conveyor belt moves the item through the scan volume, can recognize an optical code on the item, can identify an entity represented by the optical code, and can optionally add the product to a transaction that includes other products. The scan volume and an example of the optical layout of the scanner are shown in detail in FIG. 3.

Figure 3:
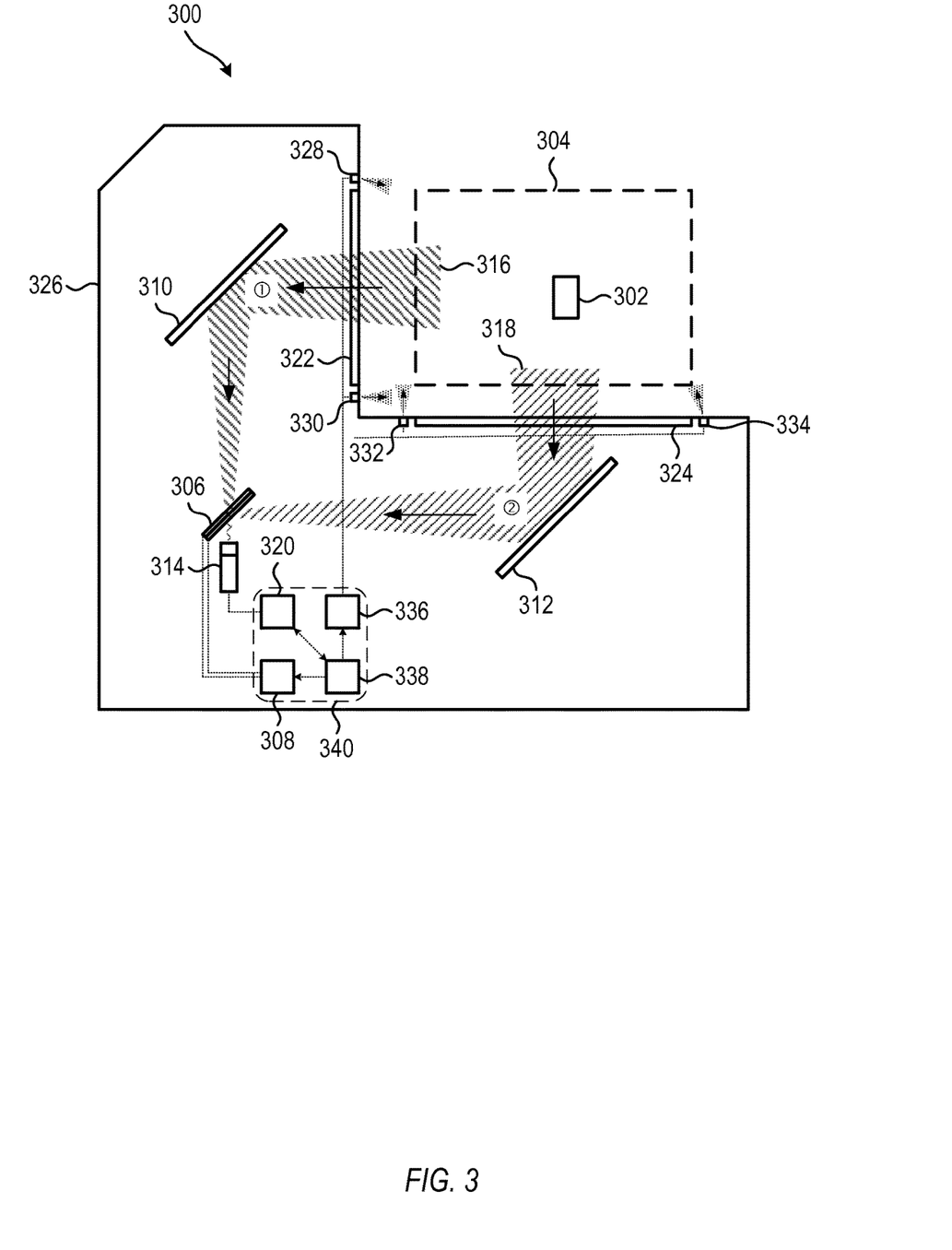
FIG. 3 shows an example of an optical layout of the scanner of FIG. 2, in accordance with some embodiments.

FIG. 3 shows an example of an optical layout of the scanner of FIG. 2, in accordance with some embodiments. Scanner 300 can be configured to scan an item 302 positioned in a scan volume 304. The item 302 is not part of the scanner 300. The scan volume 304 is geometrical construct defined by the scanner 300, and is not bounded by any physical elements. In some examples, during use of the scanner 300, an operator can pass multiple items sequentially through the scan volume 304, so that the items can be added to a transaction.

Scanner 300 can include a switchable mirror 306 configured to switch between a reflective state and a transmissive state. In some examples, the reflective state has a transmissivity (T) as close as is practical to 0% and a reflectivity (R) as close as is practical to 100%. In some examples, the transmissive state has a transmissivity (T) as close as is practical to 100% and a reflectivity (R) as close as is practical to 0%. In practice, the values can differ slightly from the ideal values of 0% and 100%, due to design compromises, design and assembly tolerances, material property variations, and other effects. For instance, a low reflectivity or transmissivity value can be 0.2%, 0.5%, 1%, 2%, 5%, 10%, or any other suitable low value greater than 0%. Similarly, a high reflectivity or transmissivity value can be 99.8%, 99.5%, 99%, 98%, 95%, 90%, or any other suitable high value less than 100%.

In a specific example, an electrically switchable mirror 306 can include a thin film of liquid crystal material disposed between two polarizers, and a pair of electrodes configured to vary a property of the thin film in response to an applied voltage. For instance, such an electrically switchable mirror is commercially available from Kent Optronics of Hopewell Junction, N.Y., and is described in detail in U.S. Pat. No. 6,859,245.

In some examples, scanner 300 can include a mirror controller 308 configured to controllably switch the switchable mirror 306 between the reflective state and the transmissive state. In some examples, the mirror controller 308 can set the switchable mirror 306 to the reflective state by applying a relatively low voltage across the electrodes of the switchable mirror 306. In some examples, the relatively low voltage can include zero volts. In some examples, the mirror controller 308 can set the switchable mirror 306 to the transmissive state by applying a relatively high voltage across the electrodes of the switchable mirror 306. The relatively high voltage can depend on the specific geometry of the switchable mirror 306, but can be on the order of 100 volts to 200 volts, typically. In some examples, the mirror controller 308 can toggle the switchable mirror 306 between the reflective and transmissive states by applying a square wave voltage profile across the electrodes of the switchable mirror 306, which the square wave varies between relatively low and relatively high voltage values, and switches between voltage at a particular switch rate.

Scanner 300 can include a plurality of mirrors, such as a first field of view mirror 310 and a second field of view mirror 312. In some examples, mirrors 310, 312 can be positioned along respective optical paths between the switchable mirror 306 and the scan volume 304. In the example of FIG. 3, each optical path between the switchable mirror 306 and the scan volume 304 includes only a single mirror. In other examples, each optical path can optionally include more than one mirror. These mirrors can be referred to as fold mirrors or flat fold mirrors, because they can allow an optical system to be folded into a smaller volume envelope than would be required without the fold mirrors. In some examples, the fold mirrors can be oriented perpendicular to the plane of the page in FIG. 3; in other examples, one or more of the fold mirrors can be oriented to reflect light out of the plane of the page in FIG. 3.

In some examples, each optical path can include mirrors positioned to divide the respective field of view into multiple fields of view. For instance, each optical path can include mirrors that divide the respective field of view into three fields of view, so that scanner can obtain an image of an item that includes three adjacent portions, the portion beings images of the item from different directions. In this manner, dividing each of two optical paths into three fields of view can provide images of an item from six sides, which can loosen restrictions on where an optical code is positioned as an item 302 is scanned through the scan volume 304.

Scanner 300 can include a camera 314 having a sensor. Camera 314 can also include focusing optics, such as a lens, which can be positioned to have a focal plane coincident with the sensor, so that an object at a specified distance along an optical path away from the camera, such as item 302, can be focused onto the sensor. In some examples, the sensor and focusing optics are fixed with respect to each other; in other examples, the sensor and focusing optics can move with respect to each other.

In some examples, camera 314 can be positioned to image a first field of view 316 of the item 302 onto the sensor with light that reflects from at least one mirror 310, of the plurality of mirrors, and transmits through the switchable mirror 306 when the switchable mirror 306 is in the transmissive state. The first field of view 316 is denoted in FIG. 3 by a circled numeral 1.

In some examples, camera 314 can be positioned to additionally image a second field of view 318 of the item 302 onto the sensor with light that reflects from at least one mirror 312, of the plurality of mirrors, and reflects from the switchable mirror 306 when the switchable mirror 306 is in the reflective state. The second field of view 318 is denoted in FIG. 3 by a circled numeral 2.

The camera 314 can therefore image two different views of the item 302, corresponding to two fields of view 316, 318, and depending on whether the switchable mirror 306 is in the transmissive or the reflective state. When the switchable mirror 306 switches from transmissive to reflective, the camera 314 image switches from the first field of view 316 to the second field of view 318. When the switchable mirror 306 switches from reflective to transmissive, the camera 314 image switches from the second field of view 318 to the first field of view 316.

In some examples, during use of the scanner 300, the mirror controller 308 can alternately switch the switchable mirror 306 between the reflective state and the transmissive state at a rate synchronized to a frame rate of the sensor. In some examples, the switch rate can equal the frame rate. In other examples, the switch rate can equal half the frame rate. In still other examples, the switch rate can equal one-third of the frame rate. In still other examples, the switch rate can equal a rational fraction of the frame rate.

In some examples, scanner 300 can include a camera controller 320. In some examples, camera controller 320 can receive a data signal from the sensor of the camera 314. In some examples, camera controller 320 can produce a square wave voltage, and direct the square wave voltage to the camera 314 to indicate the beginning/end of camera frames. In other examples, the camera 314 can produce the square wave voltage, and can direct the square wave voltage to the camera controller for synchronization with other elements in the scanner 300.

In some examples, light that transmits through the switchable mirror 306 traverses a first optical path between the scan volume 304 and the sensor of the camera 314. In some examples, light that reflects from the switchable mirror 306 traverses a second optical path between the scan volume 304 and the sensor of the camera 314. In some examples, scanner 300 can include a first scanning window 322 positioned along the first optical path adjacent the scan volume 304 between the switchable mirror 306 and the scan volume 304. In some examples, scanner can include a second scanning window 324 positioned along the second optical path adjacent the scan volume 304 between the switchable mirror 306 and the scan volume 304. In some examples, such as the example of FIG. 3, the second scanning window 324 can be oriented perpendicular to the first scanning window 322. In the specific example of FIG. 3, the first scanning window 322 is oriented vertically and the second scanning window 324 is oriented horizontally on the housing 326 of the scanner 300 during operation of the scanner 300. Other configurations can also be used, including a single scanning window, two scanning windows, or three or more scanning windows, any of which can optionally be curved.

Scanner 300 can illuminate the scan volume 304 with a plurality of light emitting diodes of the same color. For instance, the light emitting diodes can emit light having the color red, orange, yellow, green, blue, indigo, violet, white, or other suitable color in the visible spectrum, in the infrared spectrum, or in the ultraviolet spectrum. In some examples, using white light can be preferable, because white light has a relatively broad spectrum and includes many wavelengths. Illuminating the scan volume with a broad spectrum, such as for white light, can be desirable, because it can more robustly detect optical codes having varying color schemes.

In the example of FIG. 3, scanner 300 can include a plurality of white light emitting diodes 328, 330, 332, 334 positioned to illuminate the scan volume 304. In some examples, the white light emitting diodes can extend around a periphery of the first scanning window 322 and/or the second scanning window 324. In some examples, one or more of the white light emitting diodes can be located inside the housing 326, and can emit white light through the first scanning window 322 or the second scanning window 324.

In some examples, the white light emitting diodes 328, 330, 332, 334 can be positioned and angled so that illuminating white light strikes a cashier-facing side, a customer-facing side, an underside, a top side, a leading side and a trailing side of an item 302 as the item moves through the scan volume 304. In some examples, one or more of the white light emitting diodes 328, 330, 332, 334 can be angled to prevent the illuminating white light from reaching the eyes of the cashier or the customer.

In some examples, a first white light emitting diode 328, of the plurality of white light emitting diodes, is positioned to illuminate the first field of view 316 of the item 302. In some examples, a second white light emitting diode 334, of the plurality of white light emitting diodes, is positioned to illuminate the second field of view 318 of the item 302. In some of these examples, the first and second white light emitting diodes can be turned on and off to match which field of view is imaged onto the camera.

To accomplish the turning on and off of the white light emitting diodes 328, 330, 332, 334, the scanner can include an illumination controller 336. When the switchable mirror 306 is switched from the reflective state to the transmissive state, the illumination controller 336 can switch the first white light emitting diode 328 from an off state to an on state, and switch the second white light emitting diode 334 from an on state to an off state. When the switchable mirror 306 is switched from the transmissive state to the reflective state, the illumination controller 336 can switch the first white light emitting diode 328 from the on state to the off state, and switch the second white light emitting diode 334 from the off state to the on state. In other examples, the illumination controller 336 can leave the first and second white light emitting diodes 328, 334 on during operation of the scanner 300, without switching them to match the field of view.

Scanner 300 can include at least one processor 338 configured to perform data processing operations. The at least one processor 338 can be separate from the mirror controller 308, the camera controller 320, and/or the illumination controller 336, or can optionally include one or more of the mirror controller 308, the camera controller 320, and the illumination controller 336. As such, the functions of the at least one processor 338, the mirror controller 308, the camera controller 320, and the illumination controller 336 can be grouped together as a controller 340.

In some examples, the data processing operations can include receiving image data from the sensor of the camera 314. In some of these examples, the processor 338 can receive the image data directly from the camera 314; in other examples, the processor can receive the image data from a camera controller 320, which in turn can receive the image data from the camera 314.

In some examples, the data processing operations can include determining that an optical code is present in the image data. For instance, the processor 338 can employ image processing techniques on the image data to determine if such an optical code is present, and if an optical code is present, can extract the coded indicia from the optical code. In some examples, the data processing operations can include identifying an entity represented by the optical code. Such identification can include extracting the coded indicia and identifying a product, an airline passenger identity or other suitable quantity represented by the coded indicia. The identification can include comparing the extracted indicia with a look-up table, and/or submitting a query to a suitable database.

Figure 4:
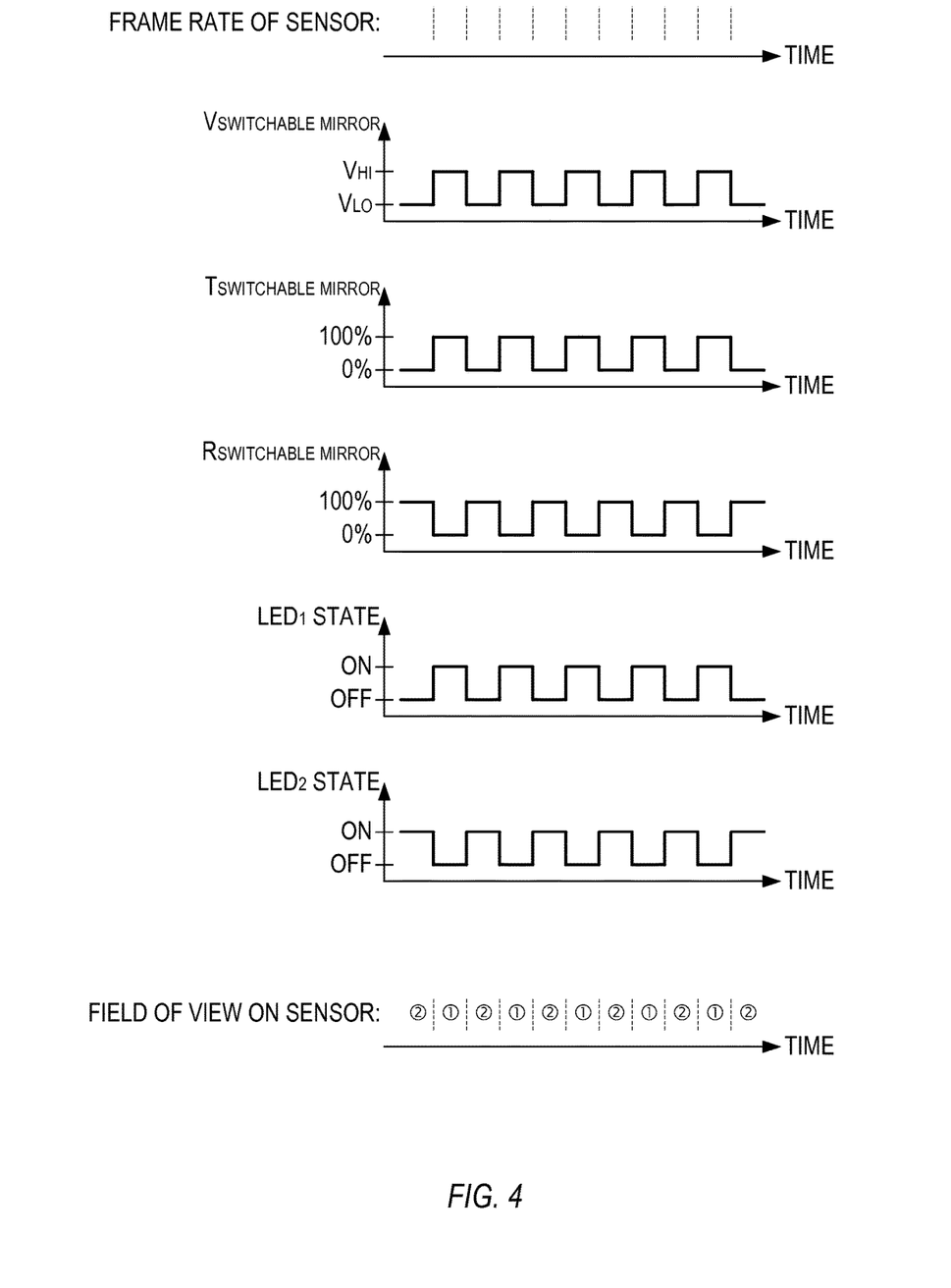
FIG. 4 shows plots of the evolution over time of various quantities in the scanner of FIGS. 2-3, in accordance with some embodiments.

FIG. 4 shows plots of the evolution over time of various quantities in the scanner of FIGS. 2-3, in accordance with some embodiments.

The frame rate of the sensor is shown at the top of FIG. 4. In some examples, the frame rate can be a video frame rate, such as 24 Hz, 25 Hz, 30 Hz, 50 Hz, 60 Hz, 75 Hz, 90 Hz, 120 Hz, more than 120 Hz, or another suitable video frame rate.

Mirror controller 308 can send a square wave voltage to the switchable mirror 306, with transitions between a low voltage ($V_{LO}$) and a high voltage ($V_{HI}$) occurring at the transitions between frames. In some examples, $V_{LO}$ is zero volts, although any suitable low voltage can be used. In some examples, $V_{HI}$ is on the order of 100 volts to 200 volts, although any suitable high voltage can be used.

The transmissivity (T) and reflectivity (R) of the switchable mirror 306 change in response to the applied voltage. In the example of FIG. 4, the low voltage produces high reflection, and the high voltage produces high transmission. In other examples, the high voltage can produce high reflection, and the low voltage can produce high transmission. As explained above, the transmissivity and reflectivity values can approach 0% and 100% as much as is practical.

Illumination controller 336 can switch on one or more white light emitting diodes that are positioned to illuminate the first field of view when the first field of view is imaged onto the sensor of the camera 314, and switch them off when the second field of view is imaged onto the sensor of the camera 314.

Likewise, illumination controller 336 can switch on one or more white light emitting diodes that are positioned to illuminate the second field of view when the second field of view is imaged onto the sensor of the camera 314, and switch them off when the first field of view is imaged onto the sensor of the camera 314.

The field of view imaged on the sensor alternates between the first field of view and the second field of view, with transitions occurring at the frame rate of the sensor of the camera 314.

These quantities, and their evolutions over time, are but one example; other suitable time-evolutions can also be used.

Figure 5:
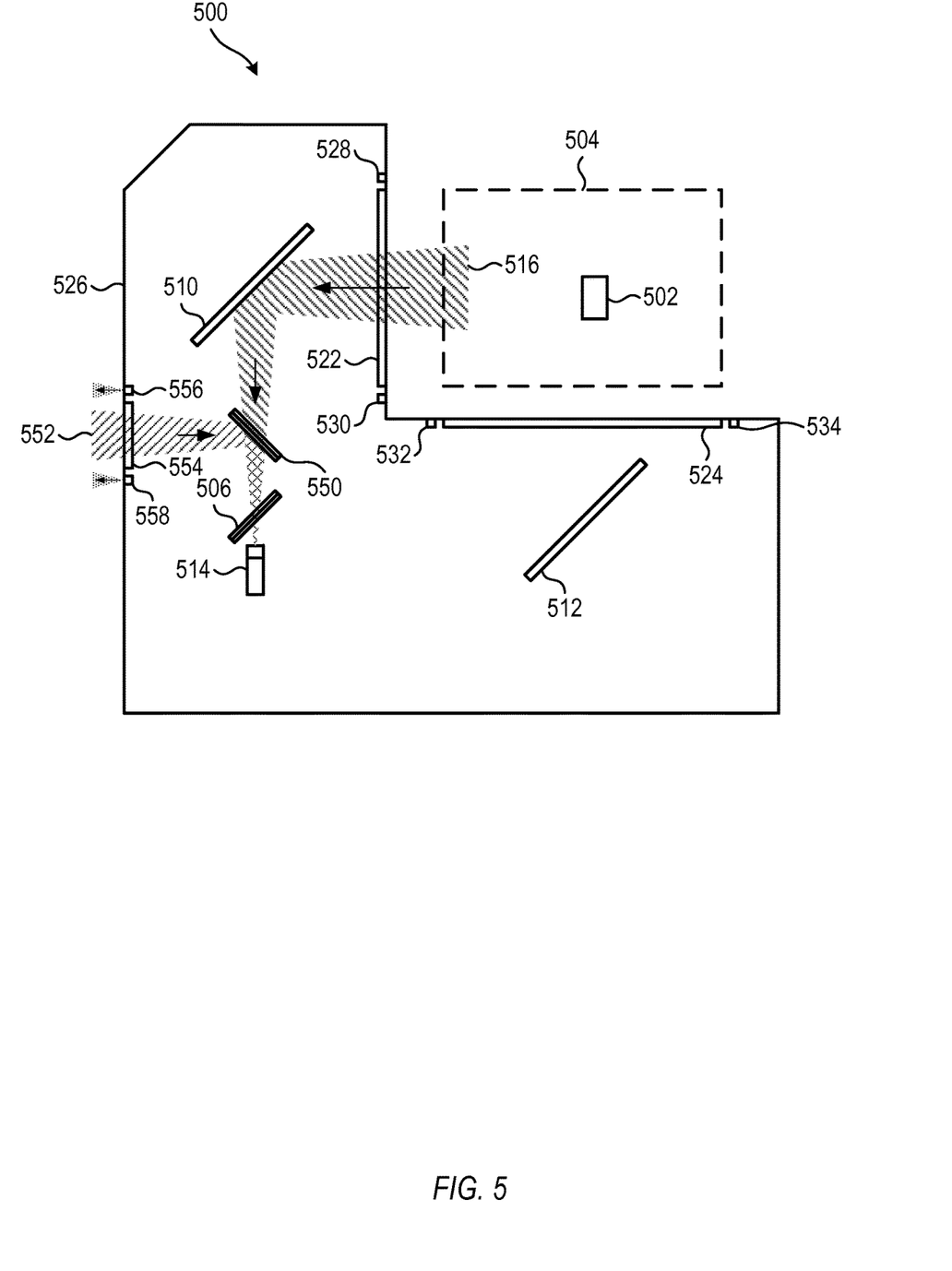
FIG. 5 shows another example of an optical layout of the scanner of FIG. 2, in accordance with some embodiments.

FIG. 5 shows another example of an optical layout of the scanner of FIG. 1, in accordance with some embodiments. Elements 502-534 of FIG. 5 are identical in structure and function to corresponding elements 302-334 of FIG. 3. Some elements of scanner 500 are omitted for clarity; it will be understood that any or all of the elements shown in FIG. 3 can also be present in scanner 500.

Scanner 500 can includes a second switchable mirror 550 configured to switch between a reflective state and a transmissive state. In some examples, the second switchable mirror 550 can be positioned to image a third field of view 552 onto the sensor of camera 514 with light that reflects from the second switchable mirror 550 when the second switchable mirror 550 is in the reflective state and when the switchable mirror 506 is in the transmissive state.

In some examples, the third field of view 552 can be directed toward the item 502 in the scan volume 504. In other examples, the third field of view 502 can be directed toward an object outside or away from the scan volume 504. For instance, the third field of view 552 can provide a view of a customer. Such a view can be useful to determine an identity of the customer, an age of the customer, or look for evidence of fraudulent behavior. For instance, the scanner 500 can process an image of the customer to look for facial wrinkles or other clues of a customer's age. As another example, the scanner can perform facial recognition of the image against a picture from a driver's license. As still another example, the scanner can acquire multiple sequential images of the customer, and process the images to look for twitches or other quirks that can help identify potential fraudulent behavior. Other examples are also possible.

Light from the third field of view 552 can pass through a window 554. Scanner 500 can optionally include one or more light emitting diodes 556, 558 to illuminate the person or object in the third field of view 552. In some examples, the more light emitting diodes 556, 558 can be white light emitting diodes. The second switchable mirror 550 can be controlled by a mirror controller, similar in structure and function to mirror controller 308 (FIG. 3).

Scanner 500 can optionally include a manual control, such as a button or a selection on a user interface, which when triggered can acquire an image from the third field of view 552. The configuration of FIG. 5 is but one examples; the scanner 500 can alternatively locate the second switchable mirror 550 at any suitable location in any of the optical paths within the scanner 500.

Figure 6:
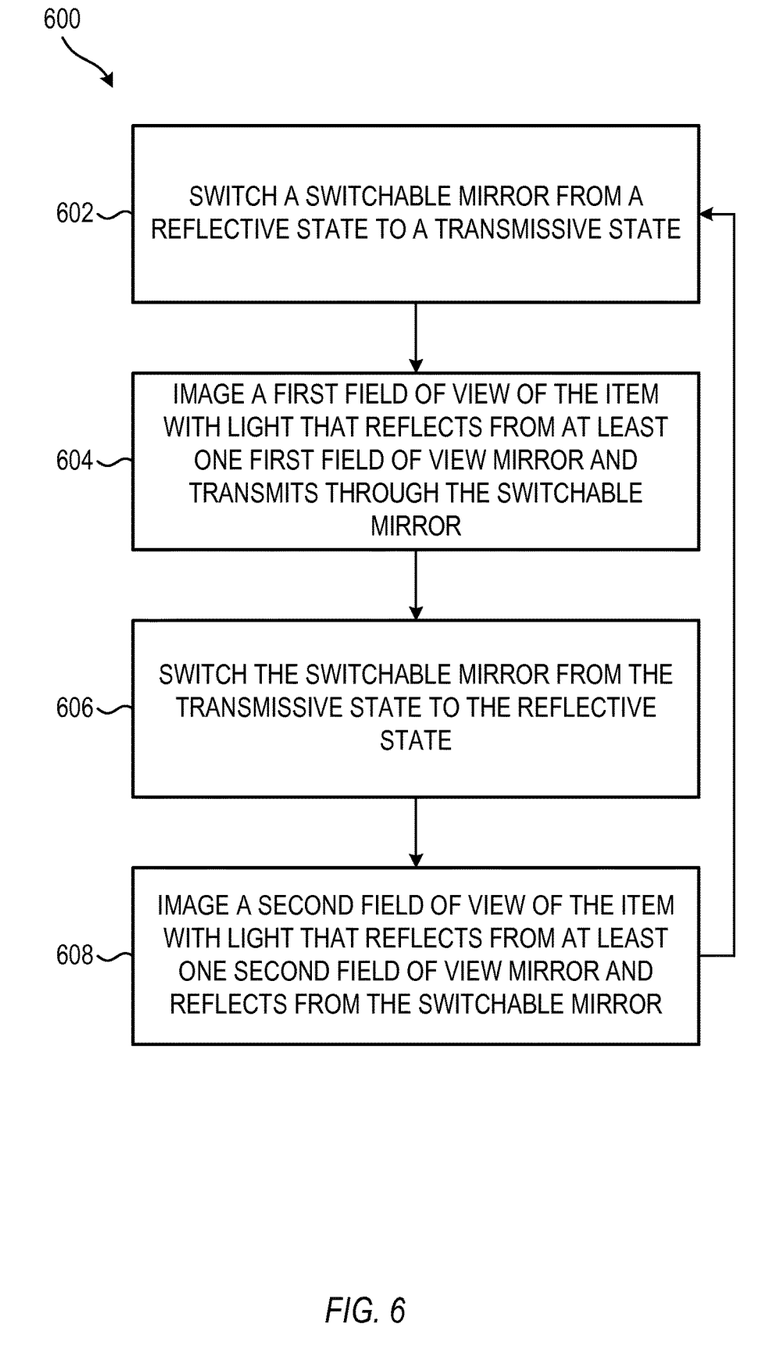
FIG. 6 shows an example of a method for scanning an item positioned in a scan volume, in accordance with some embodiments.

FIG. 6 shows an example of a method 600 for scanning an item positioned in a scan volume, in accordance with some embodiments. The method 600 can be executed on a scanner, such as 200 (FIG. 2), as well as on other suitable devices. The scanner 200 can include at least one processor, and at least one memory device storing instructions executable by the at least one processor. The instructions can be executable by the at least one processor to perform data processing activities. The data activities can include operations 602-608 described below. The method 600 of FIG. 6 is but another example; other suitable methods can also be used.

At operation 602, the scanner 200 can switch a switchable mirror from a reflective state to a transmissive state.

At operation 604, the scanner 200 can image a first field of view of the item with light that reflects from at least one first field of view mirror and transmits through the switchable mirror.

At operation 606, the scanner 200 can switch the switchable mirror from the transmissive state to the reflective state.

At operation 608, the scanner 200 can image a second field of view of the item with light that reflects from at least one second field of view mirror and reflects from the switchable mirror.

In some examples, method 600 can repeat operations 602-608 as needed. In some examples, method 600 can optionally further include illuminating the scan volume with white light from a plurality of white light emitting diodes. In some examples, method 600 can optionally further include using at least one processor to perform data processing operations. The data processing operations can include receiving image data from the sensor of the camera. The data processing operations can include reading an optical code in the image data. The data processing operations can include identifying an entity represented by the optical code.

Some embodiments can be implemented in one or a combination of hardware, firmware and software. Embodiments can also be implemented as instructions stored on a computer-readable storage device, which can be read and executed by at least one data processing device to perform the operations described herein. A computer-readable storage device can include any non-transitory mechanism for storing information in a form readable by a machine (e.g., a computer). For example, a computer-readable storage device can include read-only memory (ROM), random-access memory (RAM), magnetic disk storage media, optical storage media, flash-memory devices, and other storage devices and media. In some embodiments, checkout terminals can include one or more data processing devices and can be configured with instructions stored on a computer-readable storage device.

What is claimed is:

1. A method for scanning an item positioned in a scan volume, the method comprising:
illuminating a first field of view of the item with light from a first light emitting diode, of a plurality of light emitting diodes;
illuminating a second field of view of the item with light from a second light emitting diode, of the plurality of light emitting diodes;
repeatedly:
switching a switchable mirror from a reflective state to a transmissive state;
switching the first light emitting diode from an off state to an on state;
switching the second light emitting diode from an on state to an off state;
imaging the first field of view of the item with light from the first light emitting diode that reflects from at least one first field of view mirror and transmits through the switchable mirror;
switching the switchable mirror from the transmissive state to the reflective state;
switching the first light emitting diode from the on state to the off state;
switching the second light emitting diode from the off state to the on state; and
imaging the second field of view of the item with light from the second light emitting diode that reflects from at least one second field of view mirror and reflects from the switchable mirror;
wherein the first and second fields of view of the item are imaged, alternately, onto a sensor of a camera; and
wherein the switching of the switchable mirror, the first light emitting diode, and the second light emitting diode is synchronized to a frame rate of the sensor.

2. The method of claim 1, further comprising:
using at least one processor to perform data processing operations, the data processing operations comprising:
receiving image data from the sensor of the camera;
determining that an optical code is present in the image data; and
identifying an entity represented by the optical code.

3. The method of claim 1,
wherein the plurality of light emitting diodes are of the same color.

4. The method of claim 3,
the first light emitting diode is a white light emitting diode; and
the second light emitting diode is a white light emitting diode.

5. A method for scanning an item positioned in a scan volume, the method comprising:
illuminating a first field of view of the item with light from a first white light emitting diode, of a plurality of white light emitting diodes;
illuminating a second field of view of the item with light from a second white light emitting diode, of the plurality of white light emitting diodes;
repeatedly:
switching a switchable mirror from a reflective state to a transmissive state;
switching the first light emitting diode from an off state to an on state;
switching the second light emitting diode from an on state to an off state;
imaging the first field of view of the item onto a sensor of a camera with light from the first white light emitting diode that reflects from the item, reflects from at least one mirror, and transmits through the switchable mirror;
switching the switchable mirror from the transmissive state to the reflective state;
switching the first light emitting diode from the on state to the off state;
switching the second light emitting diode from the off state to the on state; and
imaging the second field of view of the item onto the sensor of the camera with light from the second white light emitting diode that reflects from the item, reflects from at least one mirror, and reflects from the switchable mirror; and
using at least one processor to perform data processing operations, the data processing operations comprising:
receiving image data from the sensor of the camera;
reading an optical code in the image data; and
identifying an entity represented by the optical code;
wherein the switching of the switchable mirror, the first white light emitting diode, and the second white light emitting diode is synchronized to a frame rate of the sensor.

6. A scanner for scanning an item positioned in a scan volume, the scanner comprising:
a plurality of light emitting diodes positioned to illuminate the scan volume, the plurality of light emitting diodes including a first light emitting diode positioned to illuminate a first field of view of the item, and a second light emitting diode positioned to illuminate a second field of view of the item;
a switchable mirror configured to switch between a reflective state and a transmissive state;
a plurality of mirrors;
a camera having a sensor, the camera being positioned to:
image the first field of view of the item onto the sensor with light from the first light emitting diode that reflects from at least one mirror, of the plurality of mirrors, and transmits through the switchable mirror when the switchable mirror is in the transmissive state, and
image the second field of view of the item onto the sensor with light from the second light emitting diode that reflects from at least another mirror, of the plurality of mirrors, and reflects from the switchable mirror when the switchable mirror is in the reflective state;
a mirror controller configured to alternately switch the switchable mirror between the reflective state and the transmissive state at a rate synchronized to a frame rate of the sensor; and an illumination controller configured to:
when the switchable mirror is switched from the reflective state to the transmissive state:
switch the first light emitting diode from an off state to an on state; and
switch the second light emitting diode from an on state to an off state; and
when the switchable mirror is switched from the transmissive state to the reflective state:

switch the first light emitting diode from the on state to the off state; and switch the second light emitting diode from the off state to the on state.

7. The scanner of claim 6, wherein the light that transmits through the switchable mirror traverses a first optical path between the scan volume and the sensor of the camera;

wherein the light that reflects from the switchable mirror traverses a second optical path between the scan volume and the sensor of the camera; and further comprising:

a first scanning window positioned along the first optical path adjacent the scan volume between the switchable mirror and the scan volume; and a second scanning window positioned along the second optical path adjacent the scan volume between the switchable mirror and the scan volume, the second scanning window being oriented perpendicular to the first scanning window.

8. The scanner of claim 6, wherein the-plurality of light emitting diodes are of the same color.

9. The scanner of claim 8, wherein the first light emitting diode is a white light emitting diode; and wherein the second light emitting diode is a white light emitting diode.

10. The scanner of claim 6, further comprising:

at least one processor configured to perform data processing operations, the data processing operations comprising:

receiving image data from the sensor of the camera;

determining that an optical code is present in the image data; and identifying an entity represented by the optical code.

11. The scanner of claim 6, further comprising:

a second switchable mirror configured to switch between a reflective state and a transmissive state, the second switchable mirror being positioned to image a third field of view onto the sensor with light that reflects from the second switchable mirror when the second switchable mirror is in the reflective state and when the switchable mirror is in the transmissive state.

* * * * *